T. ABTMEYER.
INDUCTION MOTOR.
APPLICATION FILED JULY 13, 1907.

920,898.

Patented May 11, 1909.

WITNESSES:
Fred H. Miller
R. J. Dearborn

INVENTOR
Theodore Abtmeyer
BY
Wesley G. Carr
ATTORNEY

UNITED STATES PATENT OFFICE.

THEODORE ABTMEYER, OF WILKINSBURG, PENNSYLVANIA, ASSIGNOR TO WESTINGHOUSE ELECTRIC & MANUFACTURING COMPANY, A CORPORATION OF PENNSYLVANIA.

INDUCTION-MOTOR.

No. 920,898.　　　　Specification of Letters Patent.　　　　Patented May 11, 1909.

Application filed July 13, 1907. Serial No. 383,698.

*To all whom it may concern:*

Be it known that I, THEODORE ABTMEYER, a citizen of the United States, and a resident of Wilkinsburg, in the county of Allegheny and State of Pennsylvania, have invented a new and useful Improvement in Induction-Motors, of which the following is a specification.

My invention relates to dynamo-electric machines and it has special reference to induction motors the secondary members of which are provided with windings of the so-called squirrel-cage type.

The object of my invention is to provide an improved construction for the secondary members of machines of the class above indicated, whereby excellent electrical connections may readily be effected and the balancing of parts facilitated.

Considerable difficulty has heretofore been experienced in connection with squirrel-cage secondaries of relatively small induction motors by reason of the fact that the electrical connections between the conducting parts and their short-circuiting end rings were relatively poor.

According to my present invention, I provide a rotatable core member having a plurality of substantially cylindrical slots that are preferably skewed relative to the axis of rotation and certain tubular conductors the ends of which project through holes in conducting end rings and are upset or expanded. With this construction, it is possible to assemble and balance a rotatable secondary member with a minimum amount of labor, since rods may be inserted in certain of the tubular conductors for balancing purposes.

Figure 1:
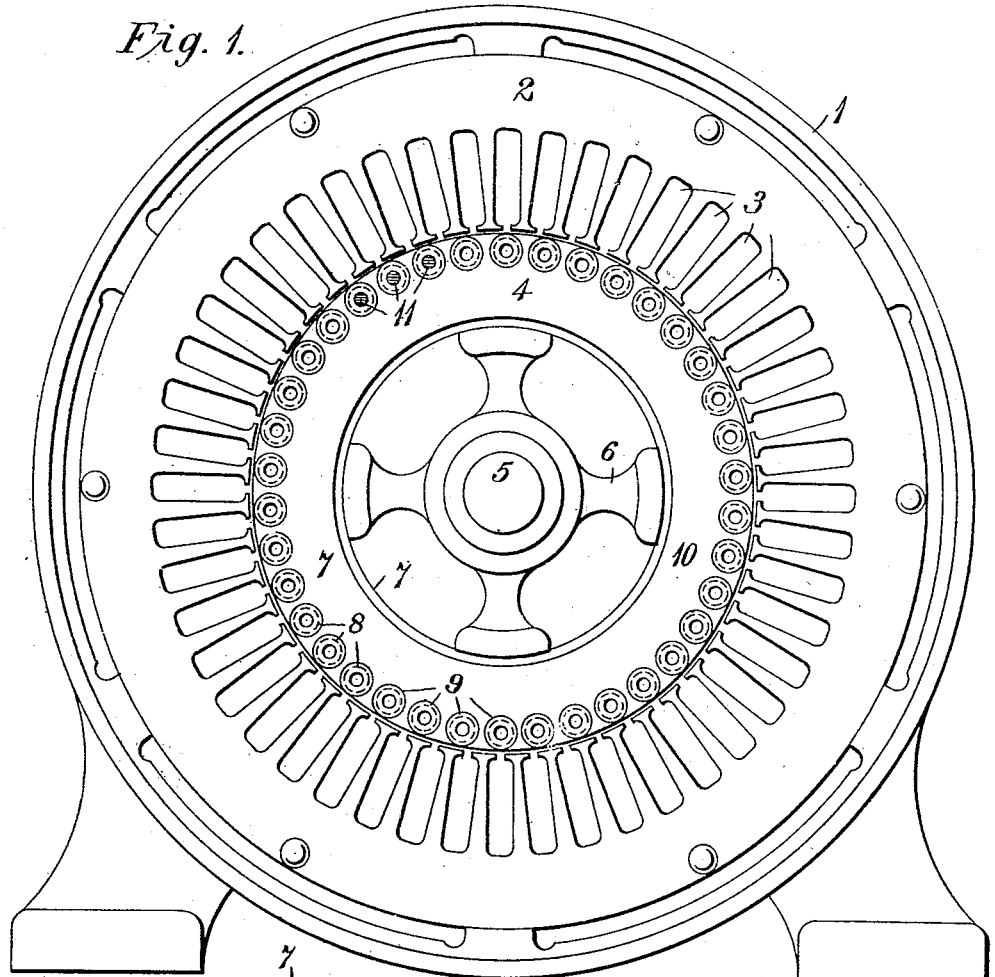
Figure 2:
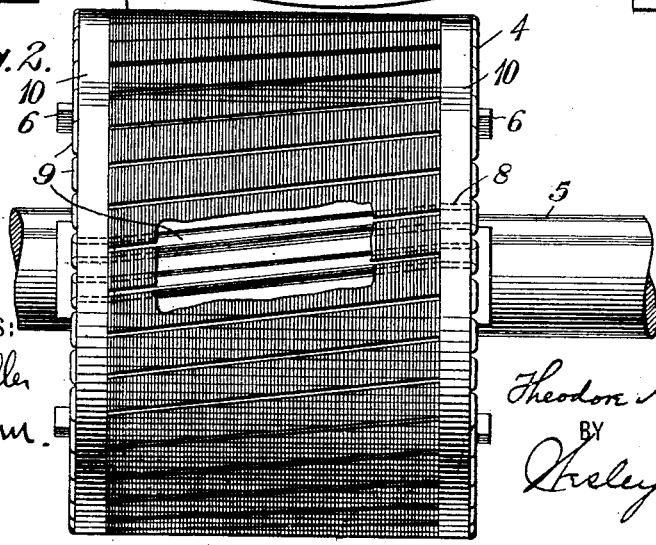

Figure 1, of the accompanying drawings, is an end elevation of a dynamo-electric machine constructed in accordance with my invention and Fig. 2 is a side elevation of the secondary member shown in Fig. 1.

Referring to the drawings, the motor comprises a stationary supporting frame 1, a core member 2 having a plurality of slots 3 and secured to the frame and a rotatable secondary member 4.

The member 4 comprises a shaft 5, a spider 6 and a substantially cylindrical core member 7 composed of a plurality of magnetizable plates assembled on the spider 6. The core member 7 is provided with a plurality of substantially cylindrical slots 8, that are preferably skewed relative to the axis and contain tubular conductors 9. The tubular conductors 9 project through holes in a pair of short-circuiting end rings 10 and their ends are upset or expanded against the outer faces of the rings to make good electrical connections and also clamp the laminæ of the core structure together.

In order to balance the rotating part after it is completed, rods 11 may be inserted in certain of the tubular conductors, thereby avoiding the labor of drilling holes in the spider and filling them with Babbitt metal, as has been the usual practice.

The tubular form of conductors, utilized as above indicated, is particularly well adapted for very small induction motors, but its application is not restricted in this regard, and I desire that only such limitations be imposed as are indicated in the appended claims.

I claim as my invention:

1. In a dynamo-electric machine, the combination with stationary and rotatable core members, one of which is provided with cylindrical slots, of tubular conductors located in said slots, short-circuiting end rings into which the conductors are expanded, and one or more balancing rods located in one or more of said tubular conductors.

2. In an induction motor, the combination with a rotatable secondary core member having a plurality of cylindrical slots that are skewed relative to its axis of rotation, of tubular conductors in said slots, short-circuiting end rings into which said conductors are expanded, and one or more balancing rods located in one or more of the tubular conductors.

3. A secondary member for an induction motor having tubular conductors that are angularly disposed with reference to its axis and balancing rods located in certain of the tubular conductors.

In testimony whereof, I have hereunto subscribed my name this 6th day of July, 1907.

THEODORE ABTMEYER.

Witnesses:
J. R. BACKOFEN,
BIRNEY HINES.